US007606528B2

(12) United States Patent
Mesecher

(10) Patent No.: US 7,606,528 B2

(45) Date of Patent: Oct. 20, 2009

(54) DISTRIBUTED CONFORMAL ADAPTIVE ANTENNA ARRAY FOR SATCOM USING DECISION DIRECTION

(75) Inventor: David Keith Mesecher, Melville, NY (US)

(73) Assignee: Northrop Grumman Corporation, Los Angeles, CA (US)

(*) Notice: Subject to any disclaimer, the term of this patent is extended or adjusted under 35 U.S.C. 154(b) by 539 days.

(21) Appl. No.: 11/595,577

(22) Filed: Nov. 10, 2006

(65) Prior Publication Data

US 2009/0023383 A1 Jan. 22, 2009

(51) Int. Cl.
*H04Q 7/20* (2006.01)

(52) U.S. Cl. .................. 455/3.02; 455/3.01; 455/550.1; 455/553.1; 455/3.04; 455/3.03; 343/705; 343/702; 343/777; 343/763; 342/357.08; 342/359

(58) Field of Classification Search ................ 455/3.01, 455/3.02, 3.03, 3.04, 3.05, 3.06, 456–457, 455/431, 500, 502, 517, 550.1, 553.1, 422.1, 455/403, 39, 42, 526; 343/705, 702, 777, 343/763; 342/357.08, 359

See application file for complete search history.

(56) References Cited

U.S. PATENT DOCUMENTS 5,317,322 A * 5/1994 Grobert ...................... 342/378
6,212,406 B1 4/2001 Keskitalo et al.
6,345,188 B1 2/2002 Keskitalo et al.
6,492,958 B2 12/2002 Yoshida
6,509,865 B2 1/2003 Takai
6,671,499 B1 12/2003 Ylitalo et al.
6,784,831 B1 * 8/2004 Wang et al. ............ 342/357.12
6,845,244 B2 1/2005 Ide et al.
2003/0146880 A1 8/2003 Chiang et al.
2003/0222818 A1 12/2003 Regnier et al.
2009/0141829 A1 * 6/2009 Feher ........................ 375/302

OTHER PUBLICATIONS

R. P. Gooch et al., "Joint Spatial and Temporal Equalization in a Decision-Directed Adaptive Antenna System", Twenty-Second Annual Asilomar Conference on Signals, Systems, and Concepts, Oct. 31-Nov. 2, 1988, 13 pgs.

A. Swindlehurst et al., "Analysis of a Decision Directed Beamformer", 22 pgs.

* cited by examiner

*Primary Examiner*—Keith T Ferguson
(74) *Attorney, Agent, or Firm*—Robert P. Lenart, Esq.; Pietragallo Gordon Alfano Bosick & Raspanti, LLP

(57) ABSTRACT

An apparatus comprises a distributed array of antenna elements for receiving a radio frequency signal on a satellite communications link, wherein the radio frequency signal includes a known preamble; a plurality of mixers for translating the radio frequency signal to a plurality of baseband signals having in-phase and quadrature components; a processor for applying weights to the baseband signals, wherein the weights are found adaptively in response to the preamble in combination with decision-directed feedback when the preamble is not present; and a receiver for processing the weighted baseband signals. A pre-processor can be used to create sub-arrays of the antenna elements using maximal-ratio weighting. A method performed by the apparatus is also provided.

10 Claims, 10 Drawing Sheets

DISTRIBUTED CONFORMAL ADAPTIVE ANTENNA ARRAY FOR SATCOM USING DECISION DIRECTION

FIELD OF THE INVENTION

This invention relates to antenna arrays for use in satellite communications systems, and more particularly to such systems that are mounted on airborne platforms.

BACKGROUND OF THE INVENTION

Communications devices mounted on airborne platforms transmit and receive signals using antennas mounted on the platforms. These signals can be transmitted on a variety of communication links to satellites, ground equipment, or communications devices on other platforms. Military satellite communications terminals typically rely on the gain and directionality associated with a steerable dish antenna to receive and transmit signals to an associated satellite. When such terminals are mounted on aircraft, developing the desired connectivity gives rise to the challenge of equipping the aircraft with compatible antenna functionality given the limited space available in most military aircraft.

An array of conformal antenna elements mounted in the airframe of an aircraft has been proposed to provide the required antenna functionality. Beamforming can be used to control the orientation and shape of the antenna pattern. Conventional open loop beamforming requires continuously updated knowledge of the satellite signal angle-of-arrival (AOA) as the aircraft maneuvers, as well as precision calibration of array-element location and phase-weighting control. It would be desirable to eliminate the need to determine the angle-of-arrival of incoming radio frequency signals.

There is a need for an antenna system that enables full-coverage of the desired connectivity between radio frequency devices in an aircraft, or other platform, and remotely located communications devices.

SUMMARY OF THE INVENTION

This invention provides an apparatus comprising a distributed array of antenna elements for receiving a radio frequency signal on a satellite communications link, wherein the radio frequency signal includes a known preamble; a plurality of mixers for translating the radio frequency signal to a plurality of baseband signals having in-phase and quadrature components; a processor for applying weights to the baseband signals, wherein the weights are found adaptively in response to the preamble in combination with decision-directed feedback when the preamble is not present; and a receiver for processing the weighted baseband signals.

The apparatus can include a pre-processor for creating a sub-array of the antenna elements using maximal-ratio weighting based on the signal quality at each element.

In another aspect, the invention provides a method comprising the steps of: receiving a radio frequency signal using a distributed array of antenna elements, wherein the radio frequency signal includes a known preamble; translating the radio frequency signal to a plurality of baseband signals having in-phase and quadrature components; applying weights to the baseband signals, wherein the weights are found adaptively in response to the preamble in combination with decision-directed feedback when the preamble is not present; and processing the weighted baseband signals.

The method can further include the step of creating sub-arrays of the antenna elements using maximal-ratio weighting based on the signal quality at each element.

DETAILED DESCRIPTION OF THE INVENTION

This invention provides a distributed conformal antenna array mounted on the frame of the aircraft or other platform, controlled by an adaptive beamforming process using decision-directed feedback.

Figure 1:
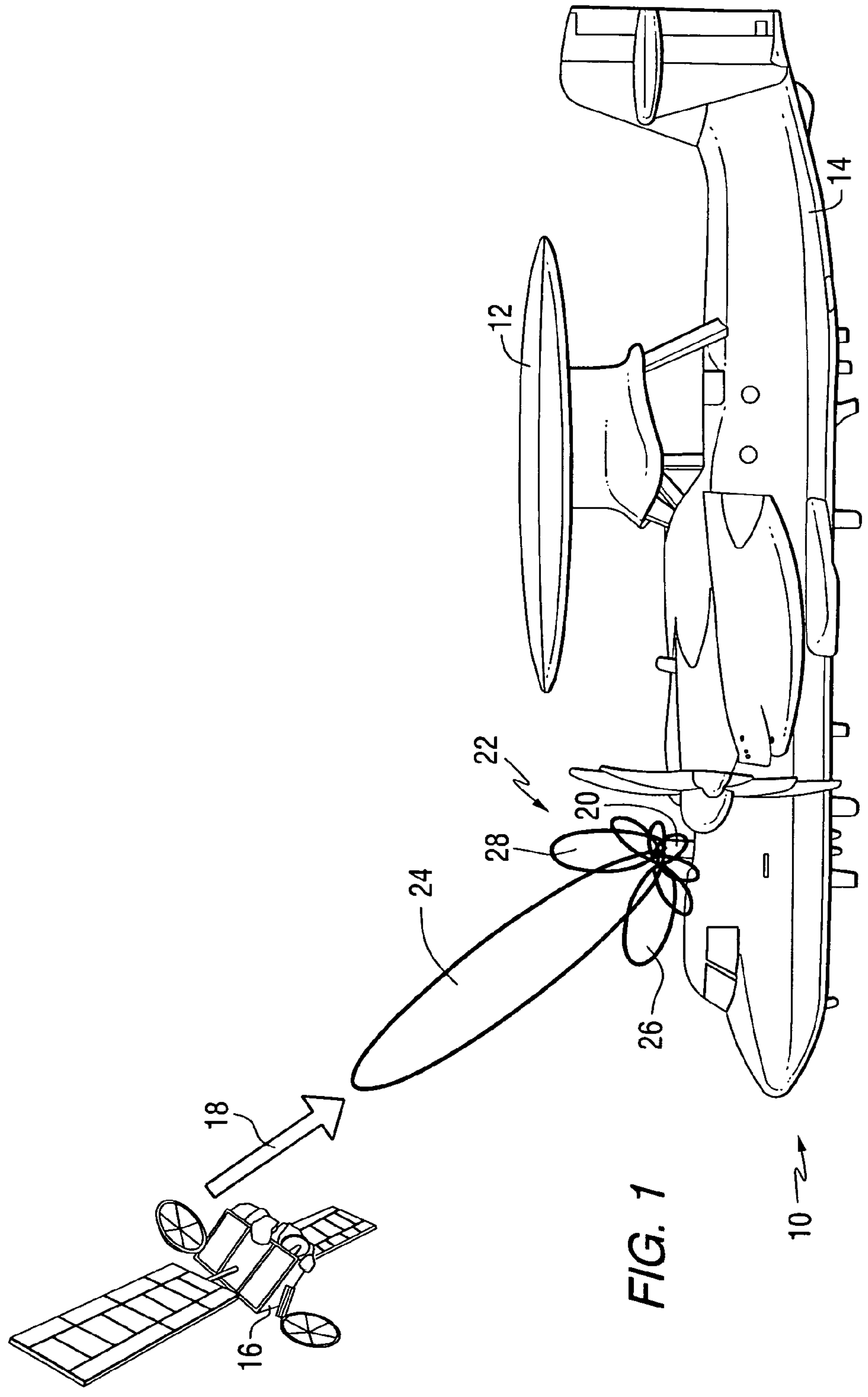
FIG. 1 is a pictorial representation of an aircraft and satellite system that can include an embodiment of the present invention.

Referring to the drawings, FIG. 1 is a pictorial representation of an aircraft and satellite system that can use the present invention. The aircraft 10 (also referred to as a platform) includes a rotodome 12 and a fuselage 14. A plurality of antennas are connected to a plurality of radio frequency devices mounted in the aircraft, including for example, communications transmitters and receivers, radar, etc.

A satellite 16 is one of many devices that can communicate with the radio frequency devices. A signal illustrated by arrow 18 can be transmitted from the satellite to the aircraft. The combined weighted summed effect of the individual antenna elements on the aircraft produces a beam pattern 22, including a main beam 24 and a plurality of sidelobes 26, 28.

The satellite and radio frequency device in the aircraft can be components of a satellite system. Satellite radio waveforms typically do not include a dedicated pilot, but rather include a short preamble in each frame of digital information. The embedded preamble, in combination with decision-directed feedback, can be exploited as a reference for an adaptive beam steering process. The typical satellite waveform includes a preamble at the beginning of a frame to allow timing synchronization to the receiver to support symbol tracking in the presence of RF carrier offsets, Doppler effects, and channel distortion. The information bits or symbols provided in this preamble are known a priori to the receiver, allowing the receiver to compare the received value of these symbols to the known value and determine the error between the two. Minimization of this error is then used as a forcing function to drive processes that maintain tracking by correcting for carrier offset, Doppler effects, and channel distortion.

Figure 5:
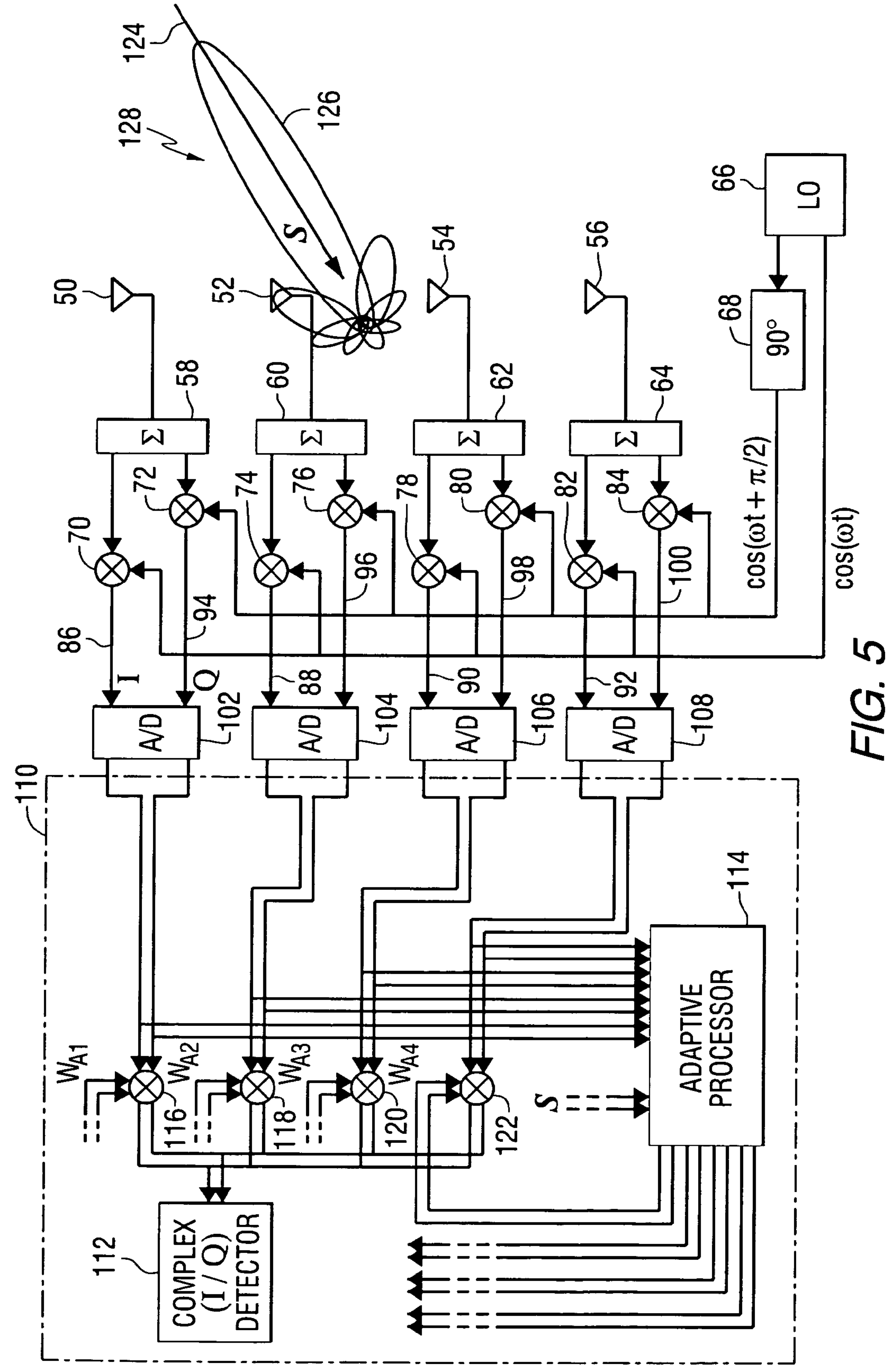
FIGS. 5, 6 and 7 are schematic diagrams of a beamforming apparatus constructed in accordance with the invention.

These same training symbols can be used to drive a Minimum Mean Square Error (MMSE) adaptive algorithm that can be implemented as shown in FIG. 5, which is a schematic diagram of a beamforming apparatus constructed in accordance with an embodiment of the invention. The apparatus includes a plurality of antenna elements 50, 52, 54, and 56 for receiving a plurality of radio frequency signals; each of the radio frequency signals has an associated magnitude and phase. Each of the antenna elements is coupled to a splitter 58, 60, 62 and 64 that splits the received analog signal into two paths. A local oscillator 66, in combination with a phase shifter 68, produces signals that are mixed with the output of the splitters in mixers 70, 72, 74, 76, 78, 80, 82 and 84 to produce in-phase signal components on lines 86, 88, 90 and 92, and quadrature signal components on lines 94, 96, 98 and 100. The in-phase and quadrature components are at analog baseband frequencies, and are converted to digital signals by analog-to-digital converters 102, 104, 106 and 108.

A digital signal processor 110 is used to apply weights to the digital baseband signals, wherein the weights are adjusted to adaptively maximize the signal-to-noise ratio in the baseband signals. A complex (in-phase and quadrature) detector 112 is used to extract information from the digital signals. Additional components of the receiver would be provided to further process the weighted baseband signals, in accordance with known signal processing techniques.

The optimal weights in the MMSE sense, $\overline{w}_{opt}$, can be determined using the formula $$\overline{W}_{opt}=[E\{\overline{x}\overline{x}^*\}]^{-1}E\{p^*\overline{x}\}=R_{xx}^{-1}s \quad (1)$$

where E{} is the expected value, the elements of the vector $\overline{x}$ correspond to the signals receive by each of the antenna elements, $\overline{x}^*$ is the complex conjugate of $\overline{x}$, p are the pilot or preamble symbols whose values are known to the receiver, $R_{xx}$ is the cross-correlation matrix of the signals received by the antenna elements, and s is the steering vector. The vector $\overline{x}$ is $$\overline{x}=\begin{bmatrix} x_1 \\ x_2 \\ x_3 \\ x_4 \end{bmatrix}.$$

The weights are determined by an adaptive processor 114, which receives the baseband signals and the input signal s, and calculates the weights $W_{A1}$, $W_{A2}$, $W_{A3}$ and $W_{A4}$. These weights are mixed with the baseband signals in mixers 116, 118, 120 and 122 to produce weighted signals that are detected by the complex detector 112.

The desired signal s, as illustrated by arrow 124, is received by the antenna elements, and the adaptive processing in the digital signal processor automatically steers the main lobe 126 of the antenna pattern 128 in the direction of the signal source, thus creating the optimal array response.

Figure 6:
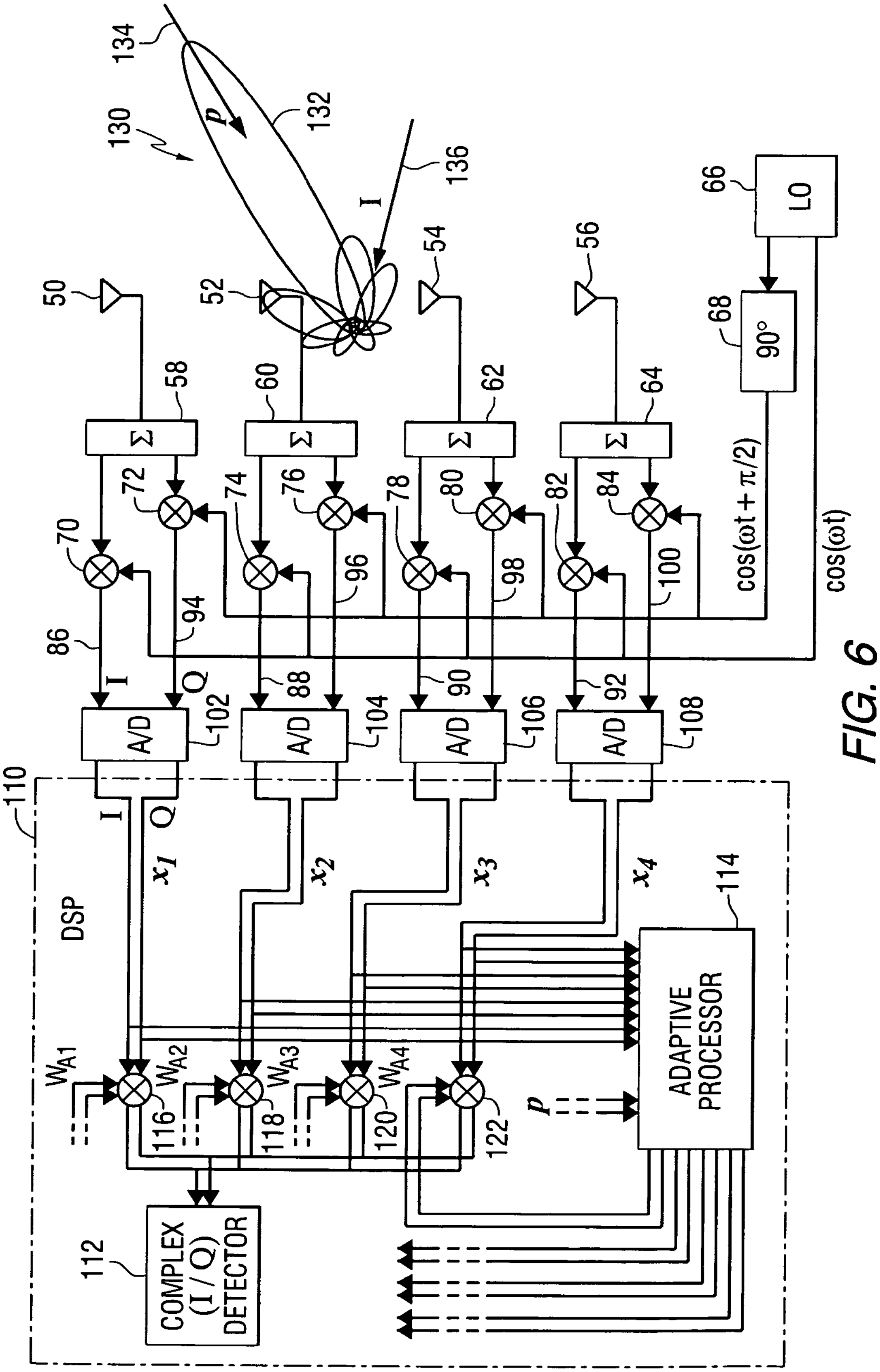

Because this process seeks to minimize the mean square error, it will automatically find the best phase (and amplitude) weighting in real time as the platform maneuvers, without knowing the satellite's (or ground terminal's) location, and without the need for precision array calibration. This avoids the need to use a single-unit pre-packaged factory-calibrated beam steering array. This automatic optimal weighting will be realized in space by an antenna array pattern, which forms a beam in the direction of the desired signal and nulls in the directions of interferers. FIG. 6 illustrates an embodiment of the invention wherein a pilot signal "p" impinges on the antenna array. Signal "p" provides a preamble that is known to the receiver and used to calculate the optimal weights using Equation (1). This adaptive process creates an optimal array response in which the main lobe 132 of the beam 130 is automatically steered in the direction of the pilot signal 134. Sidelobe nulls are automatically steered in the direction 136 of an interferer "I".

This invention includes an array antenna comprising a plurality of antenna elements. The beam pattern of the array antenna can be steered to accommodate the various signals that are received and/or transmitted by the on-board radio frequency devices. This approach would apply to any digital signal that includes embedded training symbols. In a conventional antenna array, the array is designed so that all antenna elements simultaneously receive the transmitted signal. In this invention, the antenna elements are arranged in a distributed array of antenna elements. As used herein, a distributed array is an antenna array that does not rely on all antenna elements receiving the transmitted signal simultaneously. In a distributed array, some antenna elements may be located on opposite sides of the platform on which the array is installed, so at any given time some but not all of the elements will receive the transmitted signal, and the remaining elements may be blocked from receiving the transmitted signal by the platform itself. This arrangement allows for both spatial diversity and adaptive beam steering.

Figure 7:
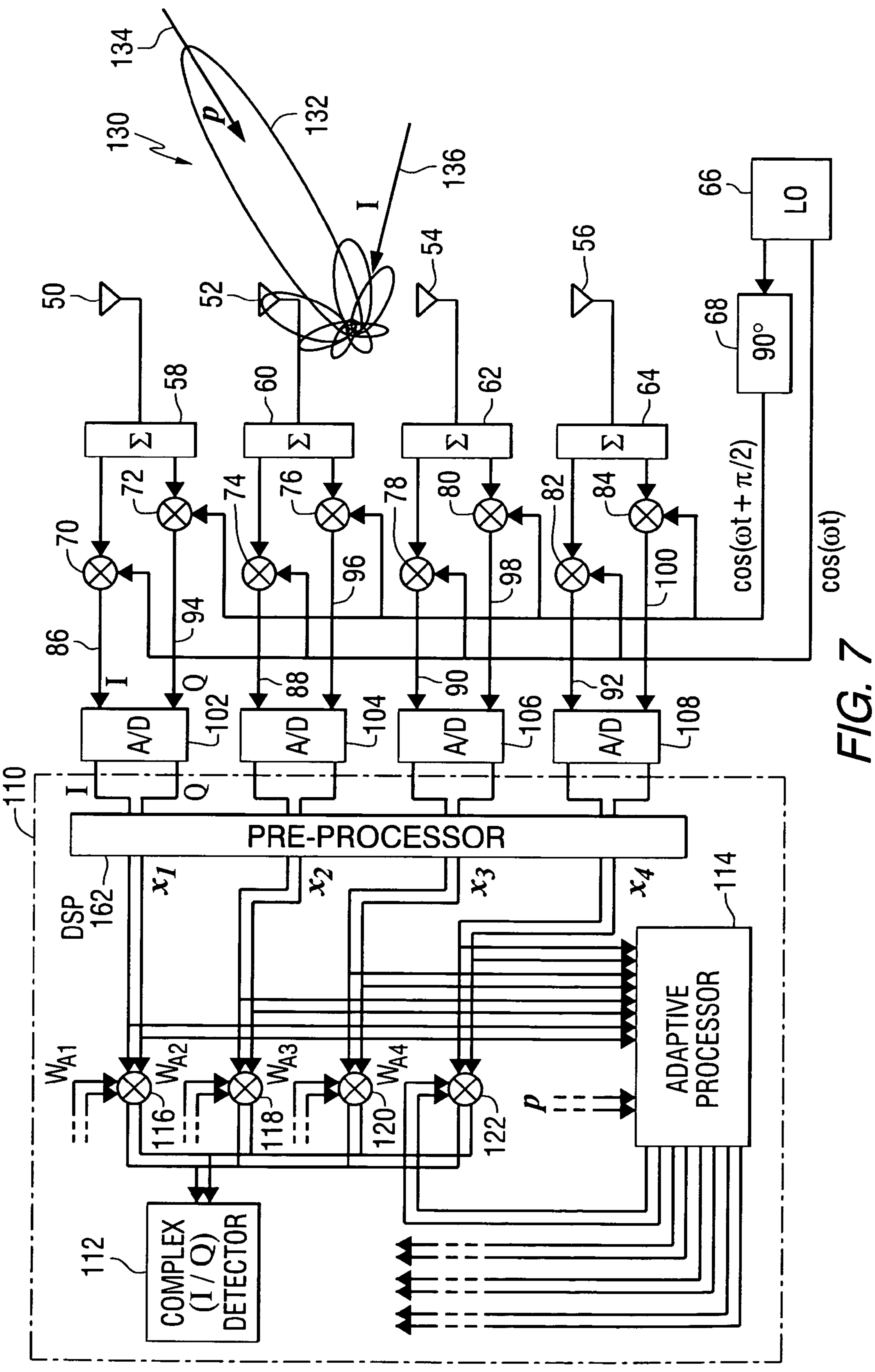

FIG. 7 illustrates an embodiment of the invention that is similar to FIG. 6, but further includes a pre-processor 162 that performs maximal-ratio weighting. Through maximal-ratio weighting, elements that do receive the transmitted signal will automatically be emphasized with high gain, while those that do not receive the transmitted signal will automatically be de-emphasized with high attenuation. This is accomplished by measuring the signal-to-noise ratio of the signal received from each element, and applying low gain to effectively turn off elements that provide signals with low SNRs, and applying full gain to elements providing signals with high SNRs. Those that are given high gain through maximal-ratio weighting will effectively form a sub-array whose array pattern will be optimized in the MMSE sense by the adaptive beamforming process.

Figure 8:
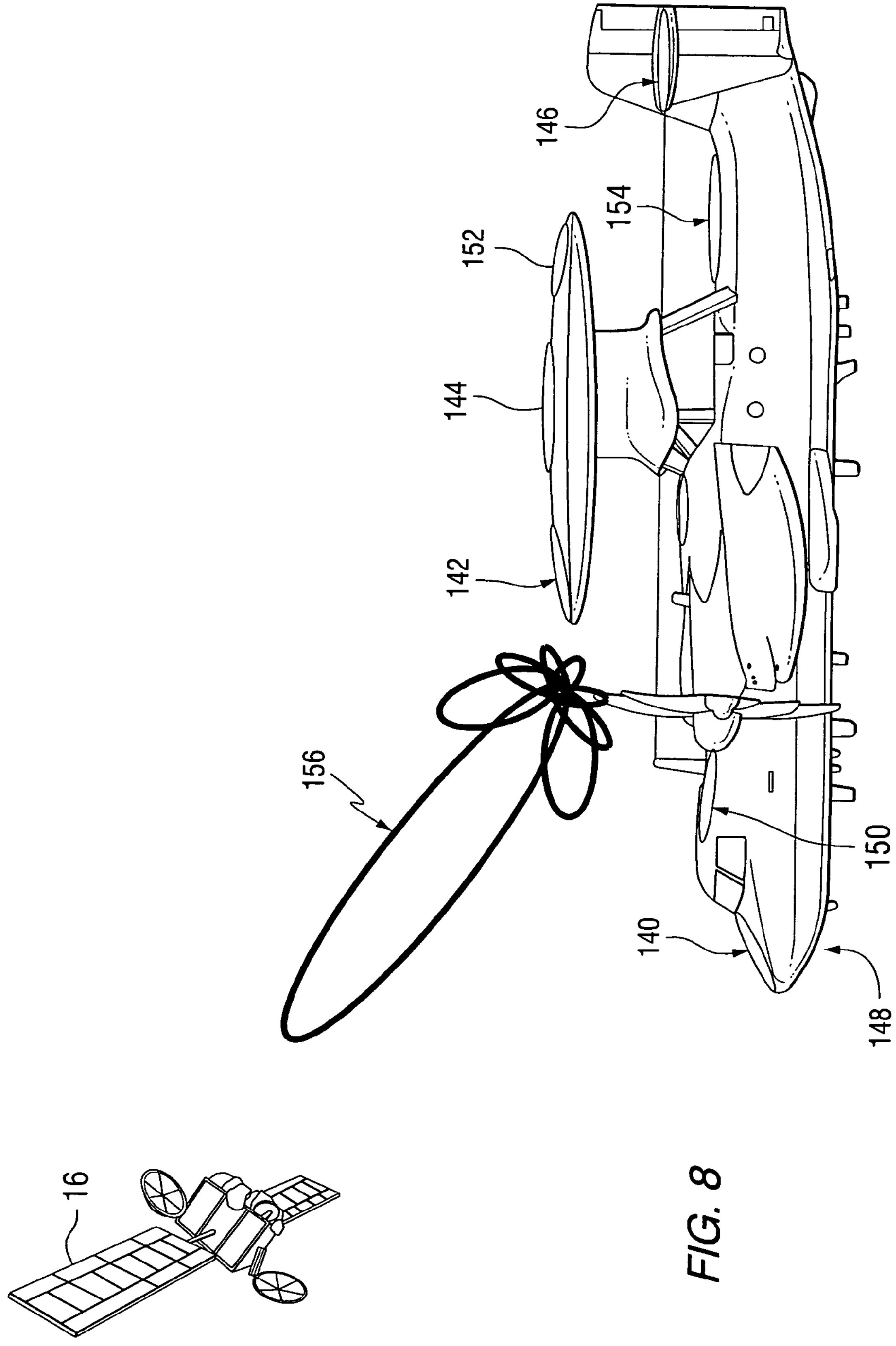
FIGS. 8 and 9 are pictorial representations of an aircraft and satellite system that can include an embodiment of the present invention.

A distributed array is illustrated in FIG. 8. FIG. 8 shows an aircraft 10 having a plurality of antenna elements 140, 142, 144, 146, 148, 150, 152 and 154. Combinations of these antenna elements can be used to produce a beam pattern 156 for communication with a satellite 16.

Figure 9:
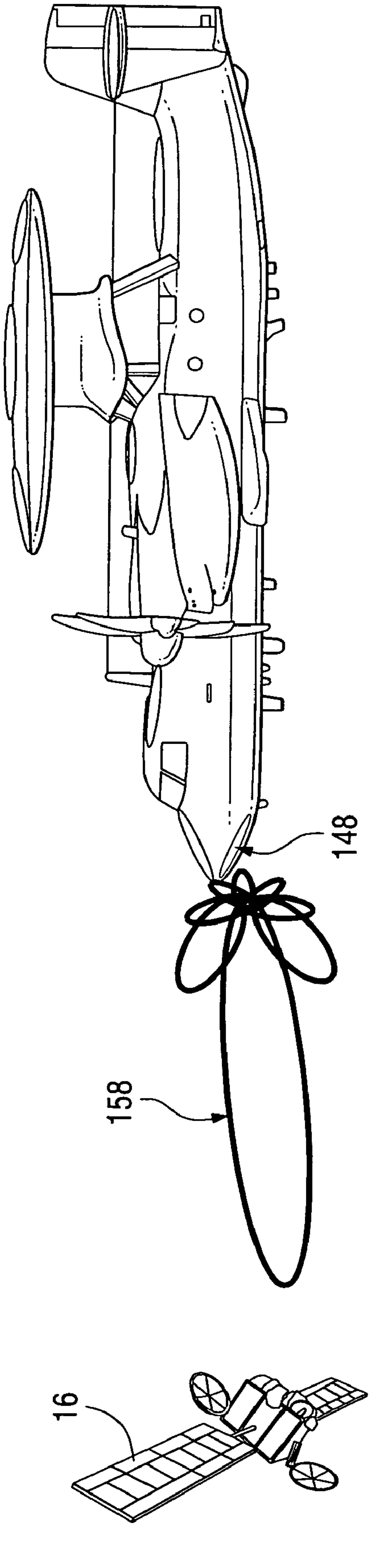

In FIG. 8, several elements from the whole array are emphasized according to the amount of satellite signal energy they receive. These elements then form a sub-array that supports adaptive beamforming. In some cases, only a single antenna element will receive significant signal from the satellite, and will therefore be the only one given gain. Under these circumstances, the response pattern of that individual element alone would provide antenna gain in the direction of the satellite. Such a case is illustrated in FIG. 9, wherein antenna element 148 produces the beam 158. The potential for these cases must be considered when designing the antenna array and selecting individual array elements.

The challenge for maintaining performance at low and negative elevation angles (i.e., the satellite lies close to or below the horizon) can be met with the distributed element antenna approach, perhaps involving parts of the airframe other than the rotodome, in which strategic elements have gain towards the horizon. An adaptive algorithm would automatically more heavily weight these elements when the desired signal is at low or negative elevation angles.

An alternate to a single distributed array could be a system of multiple sub-arrays strategically placed on the platform, each with some default pattern that is created by a default set of element weights. The arrays could be used one at a time, with the active array being selected as the one that provides the signal with the strongest SNR, or using some other criterion. Once the array selection is made, adaptive beamforming is applied to the array, and the adaptive beamforming weights would replace the default weight set. Alternatively, the arrays could be used together, with one array being selected as the primary array and used in an adaptive mode, and the others being used with their non-adaptive nominal patterns as auxiliary elements. The pre-processor performs maximal-ratio weighting in which SNR is measured at the output of each antenna array to determine which sub-arrays are the best candidates to allow the adaptive processor to have as inputs.

In another embodiment, a separate adaptive process could run on each sub-array, and the output of all sub-arrays could be combined in some optimal fashion, such as a maximal-ratio combination in which the combined output is a weighted combination of the outputs of each individual array, with more weight being given to the array outputs that have higher SNRs.

Figure 2:
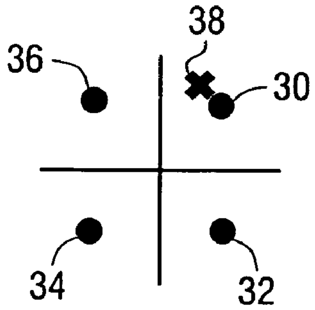
FIGS. 2, 3 and 4 are symbol diagrams.
Figure 3:
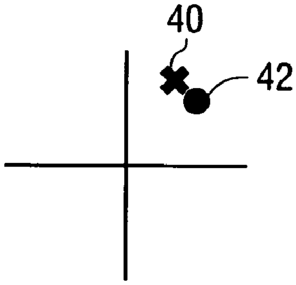
Figure 4:
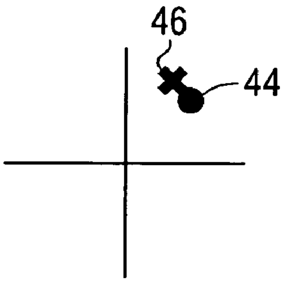

In one embodiment of the invention, the satellite transmits a quadrature phase shift keyed (QPSK) signal, having a plurality of symbols representative of digitally encoded information. FIGS. 2, 3 and 4 are symbol diagrams that illustrate a quadrature phase shift keyed signal. FIG. 2 illustrates the four possible symbols 30, 32, 34 and 36 that can be transmitted using quadrature phase shift keying. When the symbols are transmitted, they are subject to noise and/or interference such that the received symbol 38 may not be identical to the transmitted symbol. The receiver processes the received signal in accordance with known techniques to determine the actual symbol that was transmitted.

Figure 10:
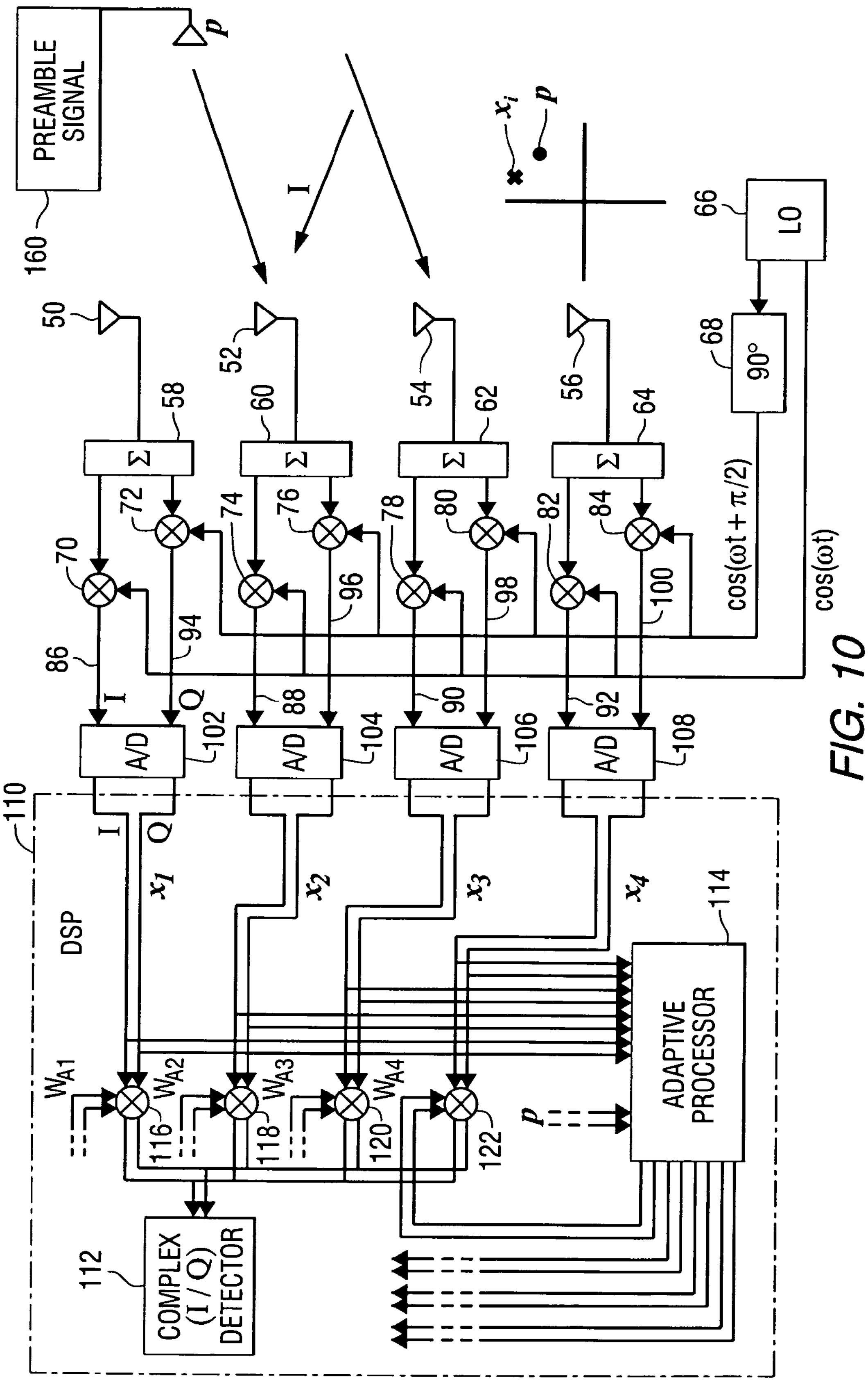
FIGS. 10, 11 and 12 are schematic diagrams of a beamforming apparatus constructed in accordance with the invention.

FIG. 3 shows a received symbol 40 and a known symbol 42. Typically, an adaptive algorithm compares a known symbol value, such as the training symbols included in a preamble or the symbols in a dedicated pilot channel, with the received symbol value. This is illustrated in FIG. 10, wherein a direction is provided by a preamble signal source, which provides a pilot signal "p" that is known to the receiver. The steering vector compares p to the received signal x, where $$E\{p^*\overline{x}\} = E\left\{p^*\begin{bmatrix} x_1 \\ x_2 \\ x_3 \\ x_4 \end{bmatrix}\right\},$$

and adjusts the beam pattern 162 accordingly.

Figure 11:
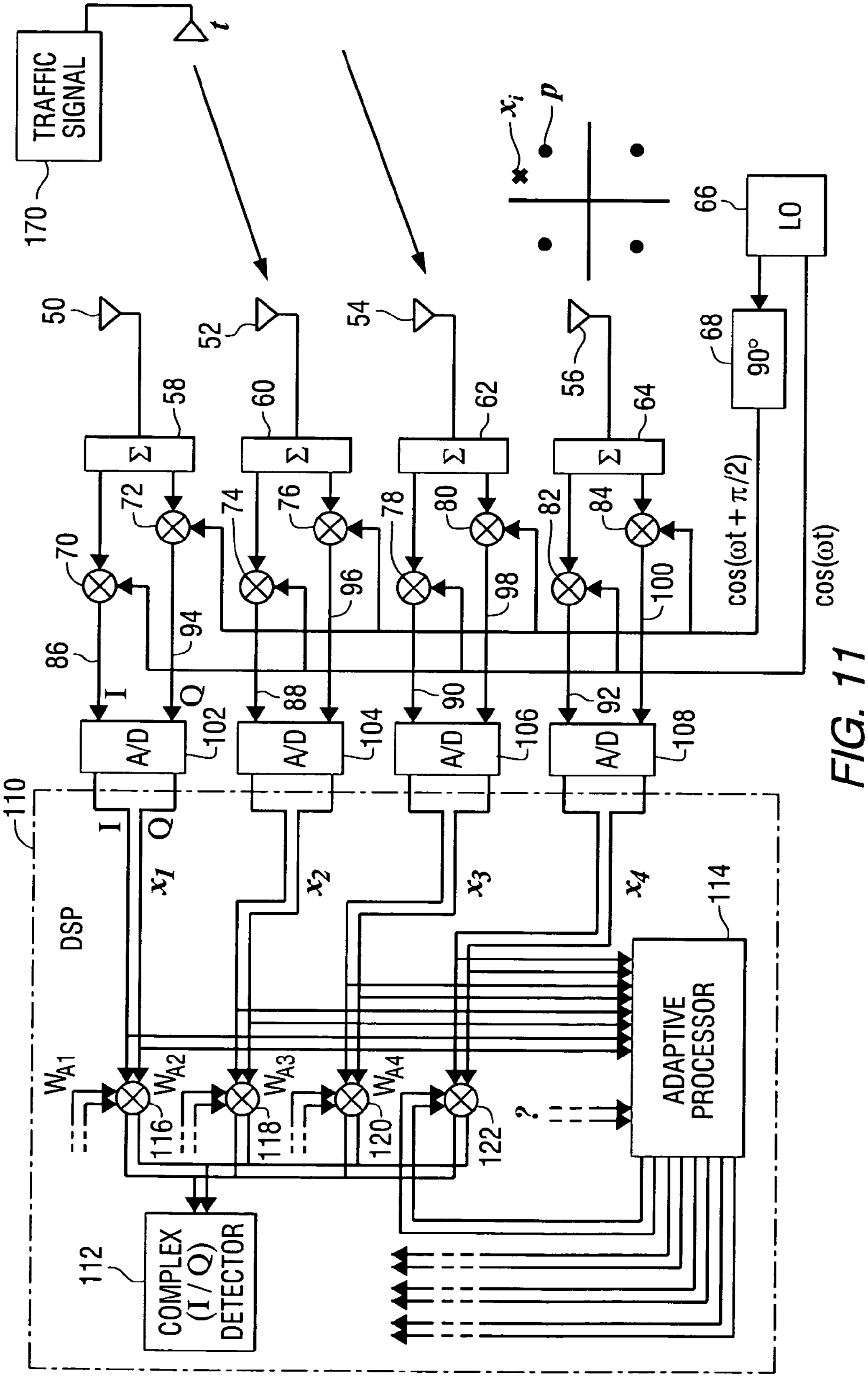
Figure 12:
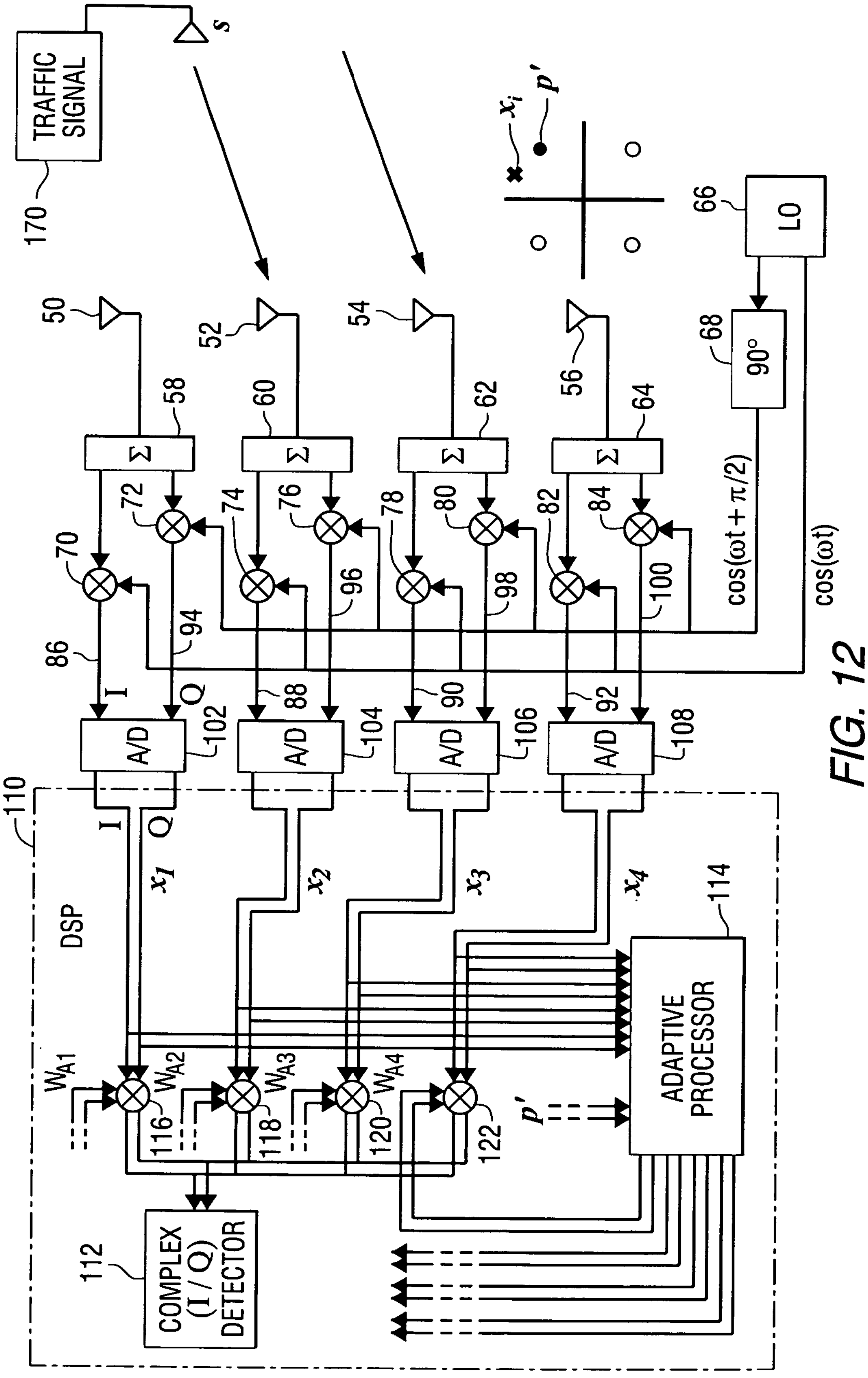

This invention uses a combination of preamble-driven adaptive processing, and decision-directed adaptive processing. Decision-directed adaptive processing is used when a priori known symbol values, such as in a preamble or a pilot signal, are not being transmitted. Instead, the process relies on user-data found in the traffic channel (the channel that carries the information that is being communicated), whose value at the receiver is not known, as is illustrated in FIG. 11. In FIG. 11, a traffic signal source 170 supplies a traffic signal "t", and $x_i$ is the received value of the traffic symbol t. Again, the weights are found adaptively to maximize SNR. The "?" on the input to the adaptive processor in FIG. 11 indicates that there is not yet a reference symbol available to use to drive the adaptive process. The reference symbol p' only becomes available after a hard decision is made on the traffic symbol $x_i$, as shown in FIG. 12.

In the decision-directed mode the algorithm makes a hard decision on the received value of the traffic symbol and assumes that the result of the hard decision is the correct value of the transmitted traffic symbol, as shown in FIG. 4. The symbol value that results from this hard decision is then used to drive the adaptive algorithm as if it were an a priori known value, comparing the hard decision 44 to the received symbol value 46, using the process shown in FIG. 12. In FIG. 12, the steering vector compares p' to x as follows $$E\{p'^*\overline{x}\} = E\left\{p'^*\begin{bmatrix} x_1 \\ x_2 \\ x_3 \\ x_4 \end{bmatrix}\right\}.$$

The direction is provided by a pilot signal known to the receiver. The weights are calculated using $$\overline{w}_{opt}=[E\{\overline{x}\overline{x}^*\}]^{-1}E\{p'^*\overline{x}\}=R_{xx}^{-1}s.$$

This invention can be applied to a surveillance aircraft, where a dish antenna would be impractical. A conformal antenna array can be used to service multiple transmitters and receivers. A decision feedback approach is used.

This technology would be valuable for other platforms as well, and the concept could be extended to all SATCOM, line-of-sight (LOS), and high frequency (HF) radio services in all bands.

While the invention has been described in terms of several embodiments, it will be apparent to those skilled in the art that various changes can be made to the described embodiments without departing from the scope of the invention as set forth in the following claims.

What is claimed is:

1. An apparatus comprising:

a distributed array of antenna elements for receiving a radio frequency signal on a satellite communications link, wherein the radio frequency signal includes a known preamble;

a plurality of mixers for translating the radio frequency signal to a plurality of baseband signals having in-phase and quadrature components;

a processor for applying weights to the baseband signals, wherein the weights are found adaptively in response to the preamble in combination with decision-directed feedback when the preamble is not present; and a receiver for processing the weighted baseband signals.

2. The apparatus of claim 1, wherein the distributed array of antenna elements is a conformal array.

3. The apparatus of claim 1, wherein the weights maximize signal-to-noise ratio in the baseband signals.

4. The apparatus of claim 1, further comprising:

a pre-processor for creating a sub-array of the antenna elements using maximal-ratio weighting.

5. A method comprising the steps of:

receiving a radio frequency signal using a distributed array of antenna elements, wherein the radio frequency signal includes a known preamble;

translating the radio frequency signal to a plurality of baseband signals having in-phase and quadrature components;

applying weights to the baseband signals, wherein the weights are found adaptively in response to the preamble in combination with decision-directed feedback when the preamble is not present; and processing the weighted baseband signals.

6. The method of claim 5, further comprising the step of:

creating sub-arrays of the antenna elements using maximal-ratio weighting.

7. The method of claim 6, further comprising the step of:

using default patterns of the sub-arrays of the antenna elements to select an active sub-array.

8. The method of claim 7, further comprising the step of:

using separate adaptive signal processing on signals received by each sub-array.

9. The method of claim 5, wherein the distributed array of antenna elements is a conformal array.

10. The method of claim 5, wherein the weights maximize signal-to-noise ratio in the baseband signals.

* * * * *